(12) United States Patent
Gilkerson

(10) Patent No.: US 7,831,806 B2
(45) Date of Patent: Nov. 9, 2010

(54) DETERMINING TARGET ADDRESSES FOR INSTRUCTION FLOW CHANGING INSTRUCTIONS IN A DATA PROCESSING APPARATUS

(75) Inventor: Paul Anthony Gilkerson, Cambridge (GB)

(73) Assignee: ARM Limited, Cambridge (GB)

( * ) Notice: Subject to any disclaimer, the term of this patent is extended or adjusted under 35 U.S.C. 154(b) by 1587 days.

(21) Appl. No.: 10/779,808

(22) Filed: Feb. 18, 2004

(65) Prior Publication Data

US 2005/0182917 A1    Aug. 18, 2005

(51) Int. Cl.
G06F 9/32    (2006.01)
(52) U.S. Cl. ..................................... 712/207
(58) Field of Classification Search ................ 712/207, 712/206, 237
See application file for complete search history.

(56) References Cited

U.S. PATENT DOCUMENTS

| | | | | |
|---|---|---|---|---|
| 5,692,168 A | * | 11/1997 | McMahan | 712/237 |
| 5,848,269 A | * | 12/1998 | Hara | 712/239 |
| 2003/0159019 A1 | * | 8/2003 | Oldfield et al. | 712/207 |

OTHER PUBLICATIONS

Hennessy, John. Patterson, David. "Computer Architecture: A Quantitative Approach". Morgan Kaufmann Publishers Inc, Third Edition. May 17, 2002. pp. A-2 and A-3.*
Furber, Steve. "ARM System-on-Chip Architecture". Addison-Wesley, 2000. pp. 382-384, 387-388.*

* cited by examiner

Primary Examiner—Eddie P Chan
Assistant Examiner—Robert Fennema
(74) Attorney, Agent, or Firm—Nixon & Vanderhye P.C.

(57) ABSTRACT

A data processing apparatus comprises a processor for executing a stream of instructions, and a prefetch unit for prefetching instructions from a memory prior to sending those instructions to the processor for execution. The prefetch unit receives from the memory a plurality of prefetched instructions from sequential addresses in memory, and detects whether any prefetched instructions are an instruction flow changing instruction, and outputs a fetch address for a next instruction to be prefetched by the prefetch unit. Address generation logic is also provided which, for a selected prefetched instruction that is detected to be an instruction flow changing instruction, determines a target address to be output as the fetch address. Address generation logic has a first address generation path and a further generation path for determining the target address. The first address generation path generates the target address more quickly than the further address generation path.

21 Claims, 2 Drawing Sheets

DETERMINING TARGET ADDRESSES FOR INSTRUCTION FLOW CHANGING INSTRUCTIONS IN A DATA PROCESSING APPARATUS

BACKGROUND OF THE INVENTION

1. Field of the Invention

The present invention relates to techniques for determining target addresses for instruction flow changing instructions in a data processing apparatus.

2. Description of the Prior Art

A data processing apparatus will typically include a processor for executing instructions. Further, a prefetch unit will typically be provided for prefetching instructions from memory that are required by the processor, with the aim for ensuring that the processor has a steady stream of instructions to execute, thereby aiming to maximise the performance of the processor.

The instructions forming a stream of instructions to be executed by the processor are often not stored in memory one after the other, since software execution often involves changes in instruction flow that cause the processor to move between different sections of code dependent on the tasks being executed. An instruction flow changing instruction is typically used to implement such a change in instruction flow, one example of such an instruction flow changing instruction being a branch instruction, which results in the instruction flow jumping to a particular section of code determined by a target address derived from the branch instruction. In the absence of such an instruction flow changing instruction, the prefetch unit can assume that the next instruction that will be required by the processor will be an instruction from the next sequential address in memory.

When the prefetch unit issues a fetch address identifying the next instruction to be prefetched from memory, it is known to return from memory two instructions from sequential addresses in memory, this being done to make more efficient use of the available bus bandwidth between the prefetch unit and memory. If both of these instructions are not instruction flow changing instructions, the prefetch unit can then issue as the next fetch address an address for the instruction immediately following in memory the two instructions just prefetched. However, if either one of the two retrieved instructions is an instruction flow changing instruction, then the target address for the detected instruction flow changing instruction will need to be determined, and that target address used as the next fetch address issued by the prefetch unit.

In situations where the prefetch unit receives simultaneously two instructions rather than just a single instruction, then this increases the complexity of the logic required within the prefetch unit, since it now needs to detect whether either of the two prefetched instructions are an instruction flow changing instruction, and needs to be able to determine a target address for either prefetched instruction in the event that either prefetched instruction is an instruction flow changing instruction. This increased complexity can adversely affect the timing performance of the prefetch unit.

Clearly if more than two instructions were to be prefetched simultaneously from memory, this would further increase the complexity of the computation to be performed by the prefetch unit, and is likely to have a further adverse effect on the timing performance of the prefetch unit. It is envisaged that this is likely to introduce a critical timing path into the operation of the data processing apparatus, since any delay introduced by the increased processing within the prefetch unit will delay the time at which the fetch address for a next instruction is issued from the prefetch unit, with the result that when the processor subsequently executes the instruction flow changing instruction, it may then have to stall pending receipt of the next required instruction as defined by the target address.

It is an object of the present invention to allow the prefetch unit to receive simultaneously multiple prefetched instructions from memory, whilst alleviating the risk of introducing a critical timing path within the data processing apparatus.

SUMMARY OF THE INVENTION

Viewed from a first aspect, the present invention provides a data processing apparatus, comprising: a processor operable to execute a stream of instructions; a prefetch unit operable to prefetch instructions from a memory prior to sending those instructions to the processor for execution, the prefetch unit being operable to receive from the memory simultaneously a plurality of prefetched instructions from sequential addresses in memory, and being operable to detect whether any of those prefetched instructions are an instruction flow changing instruction, and based thereon to output a fetch address for a next instruction to be prefetched by the prefetch unit; and address generation logic within the prefetch unit and operable, for a selected prefetched instruction that is detected to be said instruction flow changing instruction, to determine a target address to be output as the fetch address, the address generation logic having a first address generation path operable to determine the target address if the selected prefetched instruction is a first prefetched instruction in said plurality, and at least one further address generation path operable to determine the target address if the selected prefetched instruction is one of the other prefetched instructions in said plurality, the first prefetched instruction being earlier in said stream than said other prefetched instructions, the first address generation path being arranged to generate the target address more quickly than the at least one other address generation path; whereby, in the event that the first prefetched instruction is said selected prefetched instruction, the prefetch unit is operable to output the associated target address as the fetch address earlier than if one of said other prefetched instructions is said selected prefetched instruction.

It will be appreciated that in the present context the term "next" instruction is a reference to the next instruction to be prefetched by the prefetch unit following analysis of the prefetched instruction under consideration, and does not imply that in the interim period no other instructions will have been prefetched. Indeed, it will typically be the case that whilst the prefetch unit is analysing a particular prefetched instruction, one or more other instructions may be in the process of being prefetched from the memory, and accordingly the next instruction as referred to herein refers to the next instruction to be prefetched as a result of the analysis of a current prefetched instruction.

In accordance with the present invention, the prefetch unit is arranged to receive from memory simultaneously a plurality of prefetched instructions from sequential addresses in memory, the prefetch unit being operable to detect whether any of those prefetched instructions are an instruction flow changing instruction. In the event that at least one of the prefetched instructions is an instruction flow changing instruction, then one such prefetched instruction is selected, and address generation logic is used to determine a target address for that selected prefetched instruction, that target address then being used as the fetch address for a next instruction to be prefetched by the prefetch unit.

In accordance with the present invention, the address generation logic has a first address generation path and at least one further address generation path. The first address generation path is operable to determine the target address if the selected prefetched instruction is a first prefetched instruction in the plurality, i.e. that prefetched instruction within the plurality of prefetched instructions that appears first in the instruction stream. The at least one further address generation path is operable to determine the target address if the selected prefetched instruction is one of the other prefetched instructions in the plurality. The first address generation path is arranged to generate the target address more quickly than the at least one other address generation path, with the result that if the first prefetched instruction is the selected prefetched instruction, the prefetch unit is operable to output the associated target address as the fetch address one or more cycles earlier than if one of the other prefetched instructions is the selected prefetched instruction.

Hence, in accordance with the present invention, the plurality of prefetched instructions are split into two groups, the first group containing only the first prefetched instruction. For this single instruction in the first group, the address generation logic is arranged, through the provision of a dedicated first address generation path, to calculate the target address quickly. From a viewpoint of seeking to maximise performance of the core, there is significant benefit in starting the fetch resulting from the first prefetched instruction (if it is an instruction flow changing instruction) as soon as possible, because it is the earliest instruction in the instruction stream, and is accordingly the first instruction amongst the plurality of instructions that will be passed to the processor for execution.

For the other prefetched instructions in the plurality of instructions, at least one further address generation path is employed, with the target addresses for any such instructions being calculated less quickly. However, this slight sacrifice in speed with regards to the generation of the target address for these other instructions is less important when considering the risk of introducing a critical timing path, since those instructions appear later in the instruction stream. The timing path from decode logic of the prefetch unit through the address generation logic is typically the critical timing path, or nearly the critical timing path, of the design, and hence will affect the maximum clock frequency of the design. The above approach reduces the time taken to process signals within the address generation paths and hence alleviates the critical timing issue.

It will be appreciated that in some embodiments any instruction flow changing instructions may be unconditionally executed by the processor when those instructions are passed to the processor for execution. However, in an alternative embodiment, at least some such instruction flow changing instructions may be conditional, such that the processor will determine whether to execute such a conditional instruction dependent on conditions existing at the time that that instruction is considered for execution by the processor. In such embodiments, the data processing apparatus preferably further comprises: prediction logic operable to predict, for a prefetched instruction whose execution is conditional, whether that conditional prefetched instruction will be executed by the processor; in the event that the first prefetched instruction is said selected prefetched instruction and its execution is conditional, the prefetch unit being operable to output the associated target address as the fetch address if the prediction logic predicts that the first prefetched instruction will be executed by the processor. Similarly, if the first prefetched instruction was not an instruction flow changing instruction, but one of the other prefetched instructions was, with the result that one of those other prefetched instructions was chosen as the selected prefetched instruction, then the prefetch unit would in one embodiment be operable to output the associated target address for that other prefetched instruction as the fetch address, if the prediction logic predicted that that other prefetched instruction would be executed by the processor.

In the context of the present application, the term "executed" as used in connection with a conditional instruction refers to the performance of the operation indicated by the instruction following a determination having been made by the processor that the conditions associated with that instruction have been met. It will be appreciated that a conditional instruction will typically have to be at least partially decoded by the processor in order to enable the conditional information contained in that instruction to be derived and then analyzed. However, for the purposes of the present application, this process is not considered to be execution of the conditional instruction, and execution of the conditional instruction will only be considered to occur if the conditions specified by the instruction have been met. If the conditions specified by the instruction are not met, the conditional instruction is considered as not being executed.

In one embodiment, it may be possible to arrange the code such that only one of the plurality of prefetched instructions could be an instruction flow changing instruction, in which event the selected prefetched instruction that the address generation logic is arranged to determine a target address for would simply be the prefetched instruction that was determined to be an instruction flow changing instruction. However, in preferred embodiments, no such restrictions may apply, and hence it may be the case that more than one of the plurality of prefetched instructions is an instruction flow changing instruction. To deal with such situations, the prefetch unit of one embodiment associates a different priority level with each of the plurality of prefetched instructions, the first prefetched instruction having the highest priority level, and if more than one of the plurality of prefetched instructions is detected to be said instruction flow changing instruction, the prefetch unit is operable to determine as said selected prefetched instruction the prefetched instruction having the higher priority level from those prefetched instructions detected to be said instruction flow changing instruction, whereby the target address associated with that selected prefetched instruction is output as the fetch address.

Typically, the lowest priority level would be assigned to the prefetched instruction in the plurality that is latest in the instruction stream, with each instruction in the plurality that is earlier in the instruction stream being assigned a higher priority, with the first prefetched instruction hence having the highest priority level. This will ensure that in situations where more than one of the prefetched instructions is determined to be an instruction flow changing instruction, that instruction flow changing instruction appearing earliest in the instruction stream will be the selected prefetched instruction for which the target address is generated by the address generation logic.

Typically, the data processing apparatus will be controlled by a clock signal, with the operation of the various items of logic within the data processing apparatus being controlled in accordance with that clock signal. In one embodiment of the present invention, the address generation logic is operable to generate the target address for the first prefetched instruction in a same clock cycle as the prefetch unit detects that that first prefetched instruction is said instruction flow changing instruction. This is possible in embodiments of the present invention due to the provision of a dedicated address generation path for generating the target address for the first prefetched instruction. This allows the first address generation path to have a simplified structure that enables the target address to be generated in the same clock cycle as the prefetch unit detects that that first prefetched instruction is said instruction flow changing instruction.

It will be appreciated that the first and second address generation paths may be provided entirely separately from each other. However, in one embodiment, predetermined logic is shared between the first address generation path and the at least one further address generation path, and a pipeline stage is provided in the at least one further address generation path in order to increase speed of generation of the target address by the first address generation path. By sharing predetermined logic between both paths, the size of the data processing apparatus can be reduced, and this can enable costs to be reduced. However, there is the potential that the sharing of predetermined logic between both paths will increase the complexity of the first address generation path and hence have an adverse effect on the performance of that first address generation path. However, it has been found that by providing a pipeline stage in the at least one further address generation path, this can enable the speed of the first address generation path to be maintained even though predetermined logic is shared between the first address generation path and the at least one further address generation path.

It will be appreciated that more than one further address generation path may be provided in certain embodiments. However, in one embodiment, the at least one further address generation path comprises a single further address generation path used to determine the target address for any prefetched instructions other than said first prefetched instruction.

It will be appreciated that the prefetch unit can be arranged in a variety of ways. However, in one embodiment, the prefetch unit comprises decode logic operable to detect whether any of the plurality of prefetched instructions are said instruction flow changing instruction, the decode logic further being operable to decode from each prefetched instruction detected to be said instruction flow changing instruction an immediate value to be input to the address generation logic. In one embodiment, the decode logic actually produces an immediate value for each instruction, with the address generation logic only then producing a target address used as a fetch address if an instruction flow changing instruction is detected amongst the plurality of prefetched instructions.

Further, in one embodiment, the address generation logic may comprise adder logic operable to determine the target address for the selected prefetched instruction by adding the associated input immediate value to the address of that selected prefetched instruction.

In one particular embodiment, the adder logic is shared between the first address generation path and the at least one further address generation path, and a pipeline stage is provided in the at least one further address generation path in order to increase speed of generation of the target address by the first address generation path. It has been found that the provision of a pipeline stage in the at least one further address generation path allows the timing of all the address generation paths to be only slightly worse than if there was only one address generation path and a single decoder (i.e. only one prefetched instruction reviewed at a time).

In one embodiment, if none of the plurality of prefetched instructions is said instruction flow changing instruction, the prefetch unit is operable to generate the fetch address by incrementing a previous fetch address output by the prefetch unit. Hence, if at least one of the prefetched instructions is determined to be an instruction flow changing instruction, then the target address generated by the address generation logic can be used as the fetch address, whereas otherwise the fetch address can be generated by incrementing a previous fetch address output by the prefetch unit. Typically this will be done by adding to that previous fetch address a value chosen having regard to the number of prefetched instructions that are received simultaneously from the memory, such that the new fetch address provides an address for an instruction provided adjacent to the last retrieved plurality of prefetched instructions, i.e. an address at a next sequential address in memory. If no intervening instructions have been prefetched, then this new address will identify an instruction adjacent the plurality of prefetched instructions currently being analyzed by the prefetch unit. However, as mentioned previously, it may often be the case that other instructions are already in the process of being prefetched whilst a particular plurality of prefetched instructions are being analyzed by the prefetch unit, and accordingly in such instances the fetch address generated will not relate to an instruction directly adjacent to the plurality of prefetched instructions currently being analysed by the prefetch unit.

Viewed from a second aspect, the present invention provides a method of operating a data processing apparatus to determine a target address for an instruction flow changing instruction, the data processing apparatus having a processor operable to execute a stream of instructions, and a prefetch unit operable to prefetch instructions from a memory prior to sending those instructions to the processor for execution, and to output a fetch address for a next instruction to be prefetched from the memory, the method comprising the steps of: (a) receiving from the memory simultaneously a plurality of prefetched instructions from sequential addresses in memory; (b) detecting whether any of those prefetched instructions are an instruction flow changing instruction; and (c) for a selected prefetched instruction that is detected to be said instruction flow changing instruction, determining a target address to be output as the fetch address by performing one of the steps of: (c)(1) employing a first address generation path to determine the target address if the selected prefetched instruction is a first prefetched instruction in said plurality; or (c)(2) employing at least one further address generation path to determine the target address if the selected prefetched instruction is one of the other prefetched instructions in said plurality; the first prefetched instruction being earlier in said stream than said other prefetched instructions, and the first address generation path being arranged to generate the target address more quickly than the at least one other address generation path; and (d) outputting as the fetch address the target address generated at step (c); whereby, in the event that the first prefetched instruction is said selected prefetched instruction, the prefetch unit is operable to output the associated target address as the fetch address earlier than if one of said other prefetched instructions is said selected prefetched instruction.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1:
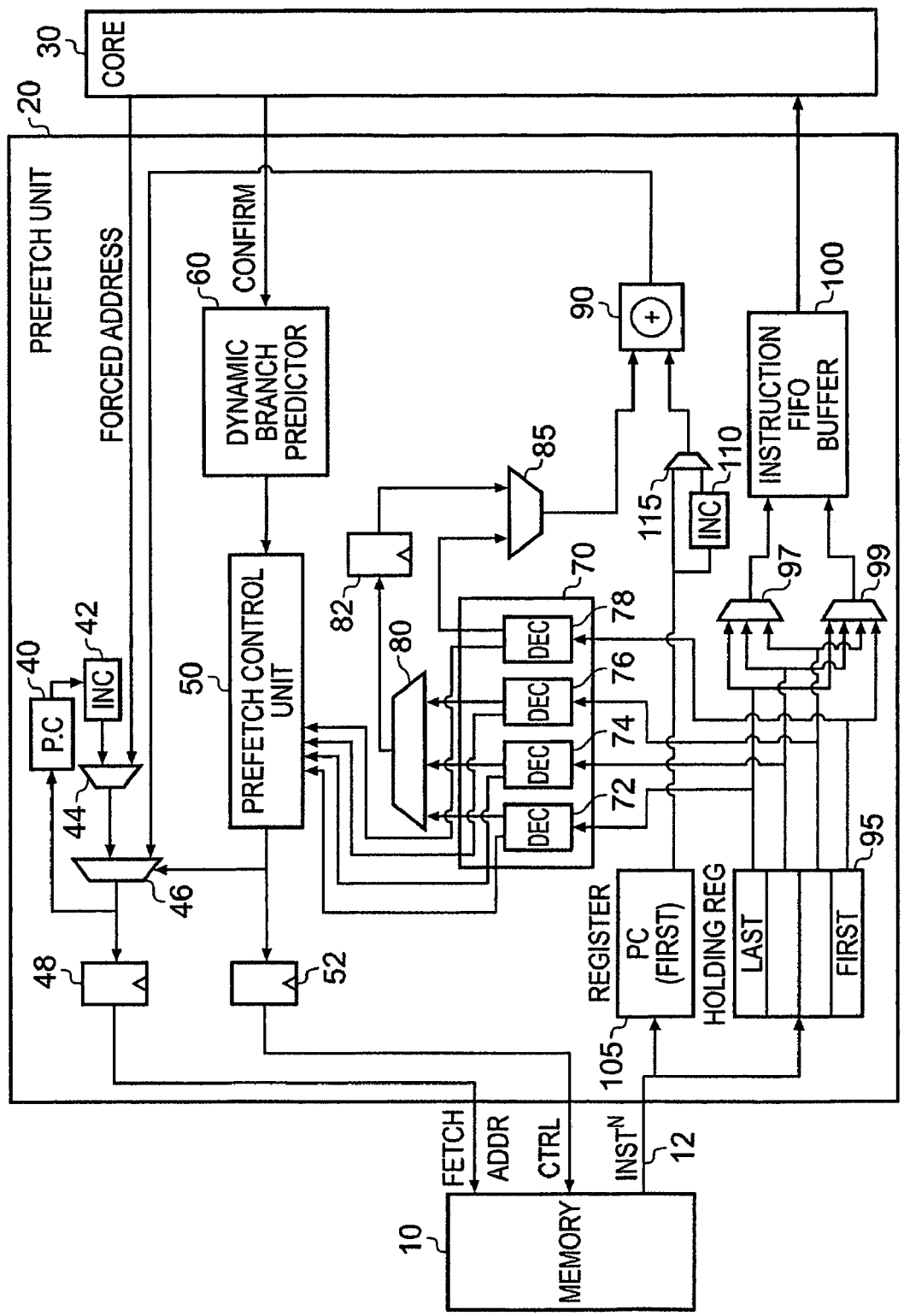
FIG. 1 is a block diagram illustrating a data processing apparatus connected to a memory in accordance with one embodiment of the present invention.

FIG. 1 is a block diagram of a data processing apparatus connected to a memory 10 in accordance with one embodiment of the present invention. The data processing apparatus includes a pipelined core 30 having a pipelined execution unit for executing instructions. The prefetch unit 20 is arranged to prefetch instructions from memory 10 that are required by the pipelined processor core 30, with the aim of ensuring that the processor core 30 has a steady stream of instructions to execute, thereby aiming to maximise the performance of the processor core 30.

Prefetch control logic 50 is arranged to issue control signals to the memory 10 to control the fetching of instructions from the memory, whilst in addition providing a control signal to the multiplexer 46 to cause a fetch address to be output to the memory 10 identifying the address of an instruction to be prefetched. A plurality of prefetched instructions from sequential addresses in memory, starting with that fetch address, are then returned from the memory 10 to the holding register 95 with the address of the first instruction of the plurality of instructions (also referred to herein as the program counter (PC) value of that first prefetched instruction) being stored in the register 105.

In the particular embodiment illustrated in FIG. 1, it can be seen that the holding register 95 is arranged to store four instructions retrieved simultaneously from the memory 10 via the bus 12. In one particular embodiment, the bus 12 is a 64-bit wide bus, and each instruction is a 16-bit instruction, for example an instruction from the Thumb instruction set developed by ARM limited, Cambridge, United Kingdom. By retrieving four instructions from sequential addresses in memory at the same time, more efficient use of the bus 12 can be made, thereby reducing the number of separate accesses that might otherwise be required to the memory 10.

With reference to FIG. 1, the first instruction in the holding register 95 is the instruction appearing earliest in the instruction stream required by the processor, and accordingly will typically be the instruction from the plurality of prefetched instructions that has the lowest address in memory. The last instruction in the holding register will likewise be the instruction appearing latest in the instruction stream, and accordingly will typically be the instruction having the highest address in memory. During each clock cycle, two of the instructions in the holding register 95 are written to the instruction FIFO (First-In-First-Out) buffer 100, the instruction FIFO buffer 100 then being arranged to provide instructions to the core 30 as and when required by the processor core. To enable two instructions to be written into the instruction FIFO buffer 100 in each cycle, the two multiplexers 97, 99 are provided, the multiplexer 99 being arranged to receive from the holding register each of the instructions stored therein, whilst the multiplexer 97 is arranged to receive only the last three instructions in the holding register 95. Hence, in a first clock cycle, the multiplexer 99 will output the first instruction to the instruction FIFO buffer whilst the multiplexer 97 will output the second instruction to the instruction FIFO buffer. Then, in the next clock cycle, the multiplexer 99 will output the third instruction to the instruction FIFO buffer 100, whilst the multiplexer 97 outputs the last instruction to the instruction FIFO buffer 100.

Each of the four instructions in the holding register 95 are also provided to the decode logic 70, and in particular to separate decode blocks 72, 74, 76, 78 associated with each instruction. Each decode block is arranged to determine whether the instruction input thereto is an instruction flow changing instruction, for example a branch instruction, and to issue a control signal indicative of that analysis to the prefetch control unit 50. During the same clock cycle, each decode block is also arranged to decode from its associated instruction an immediate value, which in the instance of an instruction flow changing instruction will specify an offset value to be added to the address of that instruction in order to form a target address for the change in instruction flow. The immediate value generated by the decode block 78 associated with the first prefetched instruction in the holding register 95 are output to the multiplexer 85, whilst the immediate values generated by each of the other decode blocks 72, 74, 76 are output to the multiplexer 80 (also referred to herein as the offset multiplexer).

During the clock cycle that the decode blocks 72, 74, 76, 78 are analysing their respective prefetched instructions, the multiplexer 85 will be arranged to output to adder logic 90 (also referred to herein as the address adder) the input that it receives from the decode block 78. The other input to the adder logic 90 is fed by the output from a multiplexer 115, which during the same clock cycle will be arranged to output to the address adder the input that it receives directly from the register 105, i.e. data specifying the address of the first prefetched instruction. The adder will then add the received offset value to that address in order to generate a target address (also referred to as a branch destination address) which will be output to the multiplexer 46.

During this same clock cycle, the prefetch control logic 50 will have received the various signals from the decode block 72, 74, 76, 78, and, in the event that the signal from the decode block 78 indicates that the first prefetched instruction is an instruction flow changing instruction, is arranged to issue a control signal over path 46 to cause the multiplexer to output to the register 48 the address received from the address adder 90. The prefetch control unit 50 will also issue appropriate control signals to the register 52, such that on the next clock cycle, the fetch address can be issued to the memory 10 from the register 48, whilst the corresponding control signals are issued to the memory 10 from the register 52.

From the above description, it will be appreciated that if the first prefetched instruction in the holding register 95 is an instruction flow changing instruction, then this fact can be communicated from the decode block 78 to the prefetch control unit 50, and the relevant target address can be calculated and forwarded via the multiplexer 46 to the register 48, within a single clock cycle. Hence, the target address can be calculated quickly in the event that the first prefetched instruction is determined to be an instruction flow changing instruction such as a branch instruction.

For the other instructions in the holding register, the immediate values decoded by the decode blocks 72, 74 and 76 are provided to the offset multiplexer 80. As mentioned earlier, the prefetch control unit 50 will receive from the decode blocks 72, 74, 76, 78 an indication as to which of the prefetched instructions, if any, are instruction flow changing instructions. Further, the prefetch control unit 50 will associate different priority levels with each of the instructions, and can use this to select between multiple prefetched instructions that are determined to be instruction flow changing instructions. In the preferred embodiment, the first instruction in the holding register 95 has the highest priority, the second instruction has the next highest priority, the third instruction has the next highest priority, and the last instruction has the lowest priority. If the prefetch control unit 50 determines from its input signals from the decode logic 70 that the first prefetched instruction is an instruction flow changing instruction, then it does not matter which of the three inputs received by the offset multiplexer 80 are output to the offset register 82, and a default control signal can be sent to the offset multiplexer 80 from the prefetch control unit 50 in such situations. This is due to the fact that the target address used to issue the next fetch address will be that generated from the immediate value output by the decode block 78, and accordingly it does not matter what value is held within the offset register 82.

However, if it is determined that the first prefetched instruction is not an instruction flow changing instruction, then the prefetch control unit 50 will determine whether any of the other three prefetched instructions are an instruction flow changing instruction, and in the event that more than one of those instructions is such an instruction flow changing instruction, will apply the priority criteria in order to select one of those instruction flow changing instructions to form the basis of the next fetch address. Accordingly, if any of the other three instructions in the holding register are determined to be an instruction flow changing instruction in situations where the first prefetched instruction is not an instruction flow changing instruction, then the prefetch control unit 50 will output an appropriate control signal to the offset multiplexer 80 in order to cause the immediate value associated with the selected prefetched instruction to be output to the offset register 82. This will occur during the same clock cycle that the decode blocks 72, 74, 76, 78 are performing their analysis of the instructions in the holding register 95.

In the next clock cycle, the multiplexer 85 will be arranged to output to the address adder 90 the signal received from the offset register 82, and the multiplexer 115 will be arranged to output to the other input of the address adder a signal received from the increment logic 110. The increment logic 110 will receive the address of the first prefetched instruction from the register 105, and will apply the required increment in order to produce the address of the prefetched instruction selected by the prefetch control unit 50, i.e. that highest priority prefetched instruction that is determined to be an instruction flow changing instruction. Accordingly, the increment logic 110 will receive a control signal from the prefetch control unit 50 indicating the amount of increment to apply to the address received from the register 105. As a result, the address adder 90 will generate the required target address by adding the offset received from offset register 82 to the address of the selected prefetched instruction, and issue that target address to the multiplexer 46. The prefetch control unit 50 will then issue an appropriate control signal to the multiplexer 46 to cause that target address to be output to the register 48 whilst the required control signals for that fetch address will be output to the register 52.

In the cycle preceding this clock cycle, the prefetch control unit 50 may be arranged to suppress the generation of any fetch address from the register 48, and the associated fetches in the memory system would be cancelled. However, in an alternative embodiment, the prefetch unit is arranged to allow the fetch to take place, but to then ignore the data when it is returned from the memory system relating to a non-relevant fetch. In such an embodiment, there may be multiple sequential fetches going through the memory system and they would also be ignored by the prefetch unit.

Hence, it can be seen that the four instructions received in the holding register 95 are split into two groups. The first group contains only the first prefetched instruction, which is the instruction for which it is most important that the target address is calculated most quickly, since this is the earliest instruction in the instruction stream. Then, for the second group, the speed of generation of the target address is slightly less important because the instructions in the second group correspond to instructions later in the instruction stream. For the first group, the target address is calculated in one cycle, whilst for the second group the target address is calculated in two cycles, due to the presence of the offset register 82. It can be seen from FIG. 1 that this extra time is required for the second group, because the selection of the offset address by the offset multiplexer 80 must be made from three possible locations, and requires an appropriate control signal to be issued by the prefetch control unit 50. The time taken to provide this signal precludes the possibility of generating the target address for any of the latter three instructions in the holding register 95 within a single cycle.

Hence, a first address generation path can be seen to be provided by multiplexer 85, address adder 90 and multiplexer 46, this first address generation path being used to generate a target address for the first prefetched instruction. Further, a second address generation path formed by the offset multiplexer 80, offset register 82, multiplexer 85, address adder 90 and multiplexer 46, is provided to generate the target address for any of the other prefetched instructions. The provision of an additional pipeline stage in the second address generation path, through the use of the offset register 82 after the three input multiplexer 80, enables an increase in speed of generation of the target address by the first address generation path, since the multiplexer 85 need only be a two input multiplexer instead of a slower four-input multiplexer.

In addition, because the control signal for the multiplexer 85 as well as the input from the second address generation path into multiplexer 85 are both early signals, the logic consisting of the multiplexer 85 and the decoder 78 can be combined and optimised by a synthesis tool in such a way that the addition of the second address generation path adds little to the timing of the first address generation path.

This hence enables the immediate input to the address adder 90 to be ready at a significantly earlier stage than would be achieved if the offset register 82 were not provided, and this assists in enabling the first address generation path to be able to generate the target address in a single cycle.

To further assist in enabling the first address generation path to be able to generate the target address within a single cycle, the multiplexer 46 is preferably arranged to be a two input multiplexer, which hence incurs less delay in the propagation of the signal to the register 48 than would incur for a multiplexer having more than two inputs. However, since the selection of the next fetch address can occur from more than two sources, an additional multiplexer 44 is typically provided to handle the other possible inputs. A current PC value is stored in the register 40, which receives its input from the output of the multiplexer 46. The output from the register 40 is then fed to an incrementer 42 which then provides an incremented version of the PC value as an input to the multiplexer 44. The increment logic 42 preferably increments the PC value by a value equivalent to four instructions, due to the fact that four instructions are retrieved simultaneously from memory.

In the event that the prefetch control unit 50 determines that none of the four prefetched instructions are instruction flow changing instructions, the prefetch control unit 50 will then control the multiplexer 44 to output the incremented PC value from the increment logic 42 to the multiplexer 46, and further will control the multiplexer 46 to output that received value to the register 48, from where it can be output as the next fetch address.

The prefetch control logic 50 is arranged to receive a signal from the dynamic branch predictor 60, which, for conditional instructions, is arranged to provide an indication as to whether the instruction is predicted as being taken (i.e. executed) or not taken. The dynamic branch predictor operates in a conventional manner, and is provided with a confirmed signal from the core 30, giving history information about the outcome of previously predicted conditional instructions, this history information being used to update the information maintained by the dynamic branch predictor 60 and used to make future predictions.

The dynamic branch predictor 60 can be arranged to output a signal to the prefetch control logic 50 every cycle, but in that instance the prefetch control logic is only arranged to consider the signal that it receives from the dynamic branch predictor 60 in instances where the decode logic 70 has identified that at least one of the prefetched instructions is a conditional instruction flow changing instruction.

If the dynamic branch predictor 60 predicts that a conditional instruction will be taken, then the prefetch control unit is arranged as discussed previously to control the multiplexer 46 to ensure that the target address generated by the address adder 90 is output as the next fetch address. However, if the dynamic branch predictor predicts that the conditional instruction will not be taken, the prefetch control unit 50 is instead arranged to control the multiplexers 44 and 46 such that the next fetch address issued is the incremented PC value generated by the increment logic 42.

In situations where the pipelined core 30 subsequently determines that any prediction made by the prefetch unit 20 is inaccurate, then it will typically calculate the address for the instruction that is required next by the core, and will output that address as a forced address back to the prefetch unit 20, this forced address being input to the multiplexer 44. In that instance, the prefetch control logic 50 will cause the multiplexer 44 to output to the multiplexer 46 the forced address returned from the pipelined core 30, and will further cause the multiplexer 46 to output that forced address to the register 48 to form the next fetch address. Further, the current contents of the instruction FIFO buffer 100 and the holding registers 95 will typically be flushed, such that when the required instruction is returned from memory, that instruction can be output to the pipelined core 30.

Figure 2:
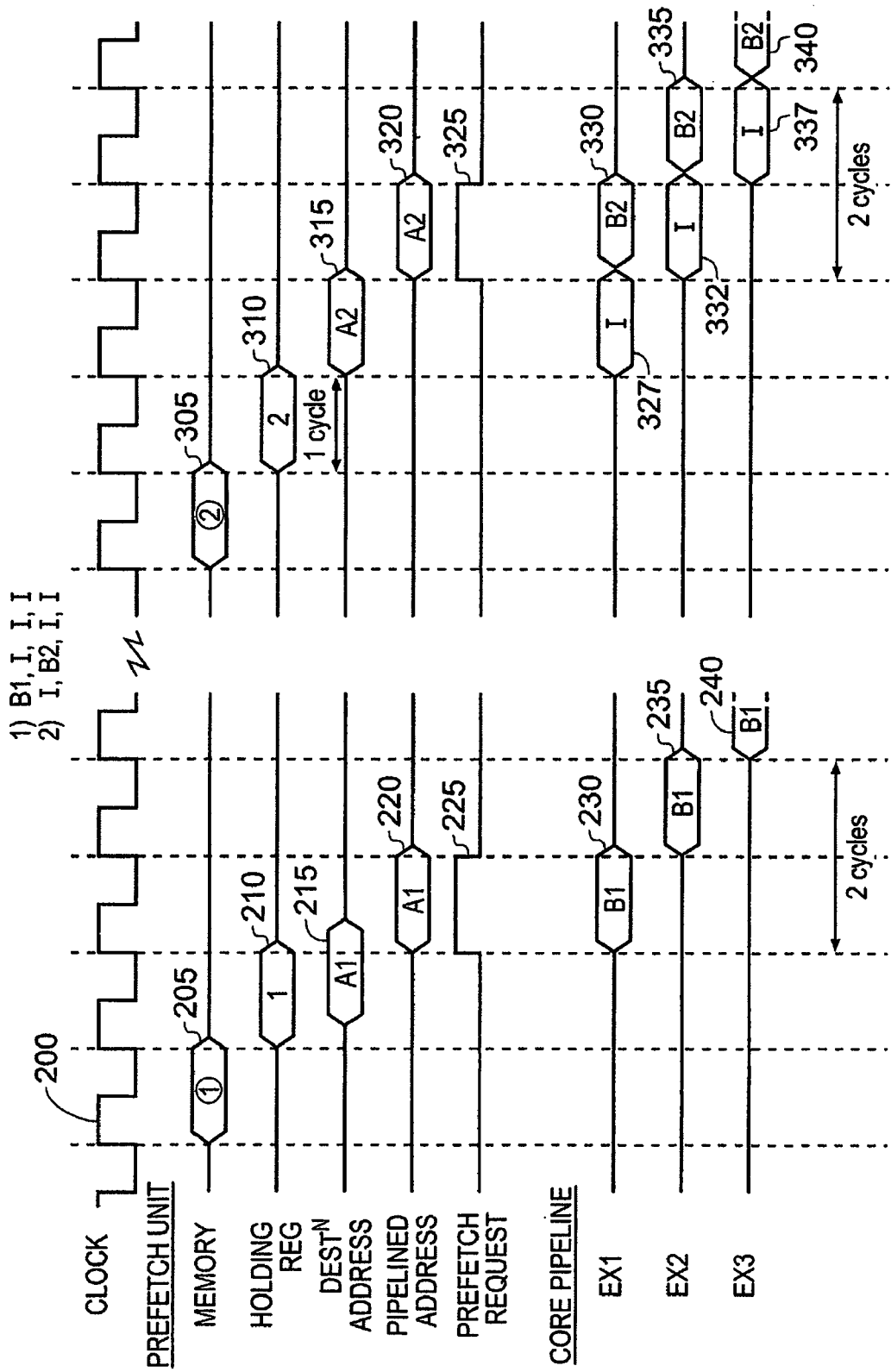
FIG. 2 is a timing diagram illustrating the relative timings of various signals issued within the prefetch unit and the core pipeline of the data processing apparatus of FIG. 1.

FIG. 2 is a timing diagram illustrating the timing of various signals issued within the prefetch unit 20 and the core pipeline 30 for two sets of retrieved prefetched instructions. The first set of prefetched instructions is considered to consist of a branch instruction, referred to in FIG. 2 as B1, followed by three standard instructions (i.e. three instructions that do not cause a change in instruction flow). In the example in FIG. 2, the various elements of the data processing apparatus are arranged to read signals on the rising edge of the clock signal 200. After issuing the fetch address for the first set of prefetched instructions, the memory is arranged to return that first set of prefetched instructions in a first clock cycle (as indicated by reference numeral 205 in FIG. 2). In the next cycle, the contents of the holding register 95 (which now contains the first set of prefetched instructions) will be output to the decode logic 70 and analysed, resulting in an indication being sent to the control unit 50 that the first instruction is a branch instruction (see block 210 in FIG. 2). In the same clock cycle, the target address (A1) for that first prefetched instruction will be generated by the first address generation path, as indicated by the reference numeral 215, and that address will be latched within the register 48. In the next clock cycle, the target address will be output as a pipelined address to the memory 10, as indicated by reference numeral 220, and during the same clock cycle, a fetch request will be issued as a control signal (see reference numeral 225 in FIG. 2) from the register 52.

Assuming for the sake of argument that the first instruction in the holding register is also passed into a first execute stage of the core pipeline 30 in this third clock cycle, i.e. two cycles after the first set of prefetched instructions are returned from the memory (see reference numeral 230), it can be seen that that instruction will then pass through a second execute stage in the next cycle (see reference numeral 235) and a third execute stage in the following cycle (see reference numeral 240). If it is in this third execute stage that the branch instruction is actually executed, and accordingly the instruction identified by the target address is required, it can be seen that the required target address has been issued to the memory system two cycles earlier, due to the provision of the first address generation path which enables the target address for that first prefetched instruction to be generated in the same clock cycle that the instructions in the holding register are decoded by the decode logic 70.

The right-hand side of FIG. 2 illustrates the timing of analogous signals for a second set of prefetched instructions, where the first instruction is a standard instruction, the second instruction is a branch instruction (referred to as B2 in FIG. 2), and the remaining two instructions are also standard instructions. In this instance, the instructions in the second set will be returned from memory in a first clock cycle (see reference numeral 305) and during the next clock cycle (see reference numeral 310) the contents of the holding register will then be output to the decode logic 70, which will determine that the second instruction is a branch instruction, and inform the prefetch control logic 50 accordingly. Since the second address generation path will be used for generating the target address for this branch instruction, then a delay of one cycle will be incurred due to the presence of the offset register 82, and accordingly the target address for this branch instruction (referred to in FIG. 2 as A2) will be issued in the next clock cycle (see reference numeral 315). This will cause the pipelined address to be output as the fetch address in the subsequent clock cycle (see reference numeral 320) along with a corresponding fetch request (see reference numeral 325).

Assuming for the sake of argument that the first prefetched instruction enters the first execute stage of the core pipeline two cycles after the second set of prefetched instructions are returned from the memory (see reference numeral 327 in FIG. 2), it can be seen that the branch instruction (i.e. the second instruction of the batch of four instructions returned from memory) will enter the first execute stage of the core pipeline in the next clock cycle (see reference numeral 330), i.e. the same clock cycle that the pipelined target address is output as the next fetch address to memory. As then can be seen by the remainder of FIG. 2, when the second branch instruction reaches the third execute stage of the core pipeline (see reference numeral 340) and is then executed, this will be two cycles after the fetch address identifying the target address for that branch has been issued to the memory system. Accordingly, the delay incurred with regards to the generation of the target address for a branch instruction that is not a first instruction in the holding register 95 will not have an adverse impact on the processing speed of the processor core 30, whilst the ability to quickly generate via the first address generation path a target address for a first prefetched instruction that is determined to be an instruction flow changing instruction reduces the risk of a critical timing path being introduced by the logic used to calculate that target address.

From the above description, it will be appreciated that the data processing apparatus of the above described embodiment of the invention enables four instructions to be received simultaneously from memory, whilst avoiding introducing a critical timing path in the calculation of target addresses for any of those four instructions. In particular, the four instructions are split into two groups, the first group containing only the first instruction in the holding register, i.e. the earliest instruction in the instruction stream. A dedicated first address generation path is then used to generate in one cycle the target address for that first prefetched instruction, such that if that first prefetched instruction is determined to be an instruction flow changing instruction, the fetch address can be quickly output to memory. All of the remaining three instructions are considered to be contained within a second group of instructions, where the speed of generation of the target address is slightly less important due to the fact that these instructions relate to instructions later in the instruction stream. Accordingly, a separate second address generation path is provided, which takes two clock cycles to generate a target address for an instruction in the second group. This extra time is required for the second group due to the need to select an offset value (immediate value) from up to three different locations.

In addition, in accordance with the above described embodiment of the present invention, only one address adder is used for both the fast and slow groups. For the fast group, the extraction of the offset (i.e. the immediate value) from the instruction is performed in the same clock cycle as the addition, whilst for the slow group, the offset from the appropriate instruction is selected and then held in a register 82. During the following cycle, that offset value is processed using the same adder as was used for the fast group.

A significant benefit of the above described embodiment of the present invention is the resultant reduction in the timing of the address generation paths, that is the time taken for the data to be processed by the combinatorial logic. This is important because the timing paths through the address generation logic are often one of the worst in the overall design and if not carefully designed would be likely to be the critical path. If this was the critical path, then this part of the overall design would directly affect the maximum clock frequency.

The timing of the address generation paths is improved by the addition of the pipeline stage (i.e. the path via register 82 of FIG. 1) for the following reasons:
1) For cases involving four or more address decoders, the address from the first decoder does not need to pass through a four (or more) way multiplexer. Instead it must only pass through a two way multiplexer 85. This is faster because a four-way multiplexer is significantly slower than a two-way multiplexer.
2) For cases involving four or more address decoders, the logic required to prioritise the branches and their corresponding addresses, on top of the decode logic, will cause the control signals for the four-way multiplexer mentioned above to arrive at about the same time as the addresses into the multiplexer. This means that the synthesis tool cannot rearrange the logic of the multiplexers to improve timing.
3) Because of the pipelined behaviour of the above-described embodiment, the two way multiplexer 85 can be controlled from a value available very early in the cycle. This is good because it allows the synthesis tools to re-arrange the logic to improve timing performance, so that the timing performance is nearly as good as if the two way multiplexer was not there. It can for example do this by combining the control value for the multiplexer with the decoder logic.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus, comprising:
a processor operable to execute a stream of instructions;
a prefetch unit operable to prefetch instructions from a memory prior to sending those instructions to the processor for execution, the prefetch unit being operable to receive from the memory simultaneously a plurality of prefetched instructions from sequential addresses in memory, and being operable to detect whether any of those prefetched instructions are an instruction flow changing instruction, and based thereon to output a fetch address for a next instruction to be prefetched by the prefetch unit;
address generation logic, within the prefetch unit and responsive to a selected prefetched instruction that is detected to be said instruction flow changing instruction, for determining a target address to be output as the fetch address, the address generation logic having a first address generation path for determining the target address if the selected prefetched instruction is a first prefetched instruction in said plurality, and at least one further address generation path for determining the target address if the selected prefetched instruction is one of the other prefetched instructions in said plurality, the first prefetched instruction being earlier in said stream than said other prefetched instructions, the first address generation path generating the target address more quickly than the at least one further address generation path; and
a pipeline stage, provided in said at least one further address generation path, for increasing generation speed of the target address by the first address generation path, whereby, in the event that the first prefetched instruction is said selected prefetched instruction, the prefetch unit outputs the associated target address as the fetch address earlier than if one of said other prefetched instructions is said selected prefetched instruction.

2. A data processing apparatus as claimed in claim 1, further comprising:
prediction logic operable to predict, for a prefetched instruction whose execution is conditional, whether that conditional prefetched instruction will be executed by the processor;
in the event that the first prefetched instruction is said selected prefetched instruction and its execution is conditional, the prefetch unit being operable to output the associated target address as the fetch address if the prediction logic predicts that the first prefetched instruction will be executed by the processor.

3. A data processing apparatus as claimed in claim 1, wherein the prefetch unit associates a different priority level with each of the plurality of prefetched instructions, the first prefetched instruction having the highest priority level, and if more than one of the plurality of prefetched instructions is detected to be said instruction flow changing instruction, the prefetch unit is operable to determine as said selected prefetched instruction the prefetched instruction having the higher priority level from those prefetched instructions detected to be said instruction flow changing instruction, whereby the target address associated with that selected prefetched instruction is output as the fetch address.

4. A data processing apparatus as claimed in claim 1, wherein the address generation logic is operable to generate the target address for the first prefetched instruction in a same clock cycle as the prefetch unit detects that that first prefetched instruction is said instruction flow changing instruction.

5. A data processing apparatus as claimed in claim 1, wherein predetermined logic is shared between the first address generation path and the at least one further address generation path.

6. A data processing apparatus as claimed in claim 1, wherein the at least one further address generation path comprises a single further address generation path used to determine the target address for any prefetched instructions other than said first prefetched instruction.

7. A data processing apparatus as claimed in claim 1, wherein the prefetch unit comprises decode logic operable to detect whether any of the plurality of prefetched instructions are said instruction flow changing instruction, the decode logic further being operable to decode from each prefetched instruction detected to be said instruction flow changing instruction an immediate value to be input to the address generation logic.

8. A data processing apparatus as claimed in claim 7, wherein the address generation logic comprises adder logic operable to determine the target address for the selected prefetched instruction by adding the associated input immediate value to the address of that selected prefetched instruction.

9. A data processing apparatus as claimed in claim 8, wherein the adder logic is shared between the first address generation path and the at least one further address generation path.

10. A data processing apparatus as claimed in claim 1, wherein if none of the plurality of prefetched instructions is said instruction flow changing instruction, the prefetch unit is operable to generate the fetch address by incrementing a previous fetch address output by the prefetch unit.

11. A method of operating a data processing apparatus to determine a target address for an instruction flow changing instruction, the data processing apparatus having a processor operable to execute a stream of instructions, and a prefetch unit operable to prefetch instructions from a memory prior to sending those instructions to the processor for execution, and to output a fetch address for a next instruction to be prefetched from the memory, the method comprising the steps of:
(a) receiving from the memory simultaneously a plurality of prefetched instructions from sequential addresses in memory;
(b) detecting whether any of those prefetched instructions are an instruction flow changing instruction; and
(c) for a selected prefetched instruction that is detected to be said instruction flow changing instruction, determining a target address to be output as the fetch address by performing one of the steps of:
(c)(1) employing a first address generation path to determine the target address if the selected prefetched instruction is a first prefetched instruction in said plurality; or
(c)(2) employing at least one further address generation path to determine the target address if the selected prefetched instruction is one of the other prefetched instructions in said plurality;
the first prefetched instruction being earlier in said stream than said other prefetched instructions, and the first address generation path being arranged to generate the target address more quickly than the at least one further address generation path;
(d) providing a pipeline stage in the at least one further address generation path in order to increase speed of generation of the target address by the first address generation path; and
(e) outputting as the fetch address the target address generated at step (c);
whereby, in the event that the first prefetched instruction is said selected prefetched instruction, the prefetch unit is operable to output the associated target address as the fetch address earlier than if one of said other prefetched instructions is said selected prefetched instruction.

12. A method as claimed in claim 11, further comprising the step of:
employing prediction logic to predict, for a prefetched instruction whose execution is conditional, whether that conditional prefetched instruction will be executed by the processor;
in the event that the first prefetched instruction is said selected prefetched instruction and its execution is conditional, the prefetch unit being operable to output the associated target address as the fetch address if the prediction logic predicts that the first prefetched instruction will be executed by the processor.

13. A method as claimed in claim 11, further comprising the steps of:
associating a different priority level with each of the plurality of prefetched instructions, the first prefetched instruction having the highest priority level;
if more than one of the plurality of prefetched instructions is detected to be said instruction flow changing instruction, determining as said selected prefetched instruction for said step (c) the prefetched instruction having the higher priority level from those prefetched instructions detected to be said instruction flow changing instruction;
whereby at said step (d) the target address associated with that selected prefetched instruction is output as the fetch address.

14. A method as claimed in claim 11, wherein at said step (c)(1) the target address for the first prefetched instruction is generated in a same clock cycle that, during said step (b), that first prefetched instruction is detected as said instruction flow changing instruction.

15. A method as claimed in claim 11, wherein predetermined logic is shared between the first address generation path and the at least one further address generation path.

16. A method as claimed in claim 11, wherein the at least one further address generation path comprises a single further address generation path used at said step (c)(2) to determine the target address for any prefetched instructions other than said first prefetched instruction.

17. A method as claimed in claim 11, wherein the prefetch unit comprises decode logic operable at said step (b) to detect whether any of the plurality of prefetched instructions are said instruction flow changing instruction, the method further comprising the step of:
employing the decode logic to decode from each prefetched instruction detected to be said instruction flow changing instruction an immediate value for use in said step (c).

18. A method as claimed in claim 17, wherein at said step (c) the target address for the selected prefetched instruction is determined by adding the associated immediate value to the address of that selected prefetched instruction.

19. A method as claimed in claim 18, wherein adder logic used to perform said adding step is shared between the first address generation path and the at least one further address generation path.

20. A method as claimed in claim 11, wherein if none of the plurality of prefetched instructions is determined at said step (b) to be said instruction flow changing instruction, the method further comprises the step of:

generating the fetch address by incrementing a previous fetch address output by the prefetch unit, and outputting that fetch address at said step (d).

21. A prefetch unit for a data processing apparatus that has a processor operable to execute a stream of instructions, the prefetch unit being operable to prefetch instructions from a memory prior to sending those instructions to the processor for execution, the prefetch unit being operable to receive from the memory simultaneously a plurality of prefetched instructions from sequential addresses in memory, and being operable to detect whether any of those prefetched instructions are an instruction flow changing instruction, and based thereon to output a fetch address for a next instruction to be prefetched by the prefetch unit, the prefetch unit comprising:

address generation logic, responsive to a selected prefetched instruction that is detected to be said instruction flow changing instruction, for determining a target address to be output as the fetch address, the address generation logic having a first address generation path for determining the target address if the selected prefetched instruction is a first prefetched instruction in said plurality, and at least one further address generation path for determining the target address if the selected prefetched instruction is one of the other prefetched instructions in said plurality, the first prefetched instruction being earlier in said stream than said other prefetched instructions, the first address generation path generating the target address more quickly than the at least one further address generation path; and a pipeline stage, provided in said at least one further address generation path, for increasing generation speed of the target address by the first address generation path, whereby, in the event that the first prefetched instruction is said selected prefetched instruction, the prefetch unit outputs the associated target address as the fetch address earlier than if one of said other prefetched instructions is said selected prefetched instruction.

* * * * *